(No Model.)
J. H. MITCHELL.
COTTON GIN RIB.
No. 269,091. Patented Dec. 12, 1882.
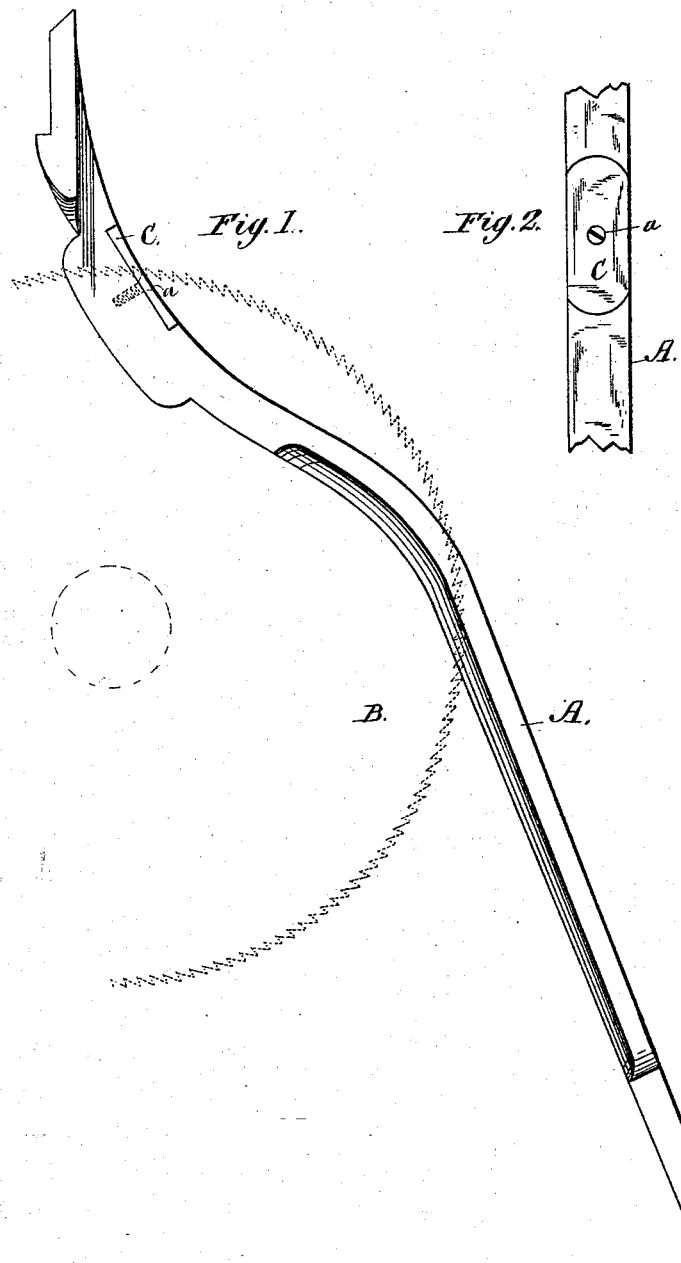

UNITED STATES PATENT OFFICE.

JORDAN H. MITCHELL, OF HATCHECHUBBEE, ALABAMA.

COTTON-GIN RIB.

SPECIFICATION forming part of Letters Patent No. 269,091, dated December 12, 1882.

Application filed April 10, 1882. (No model.)

*To all whom it may concern:*

Be it known that I, JORDAN H. MITCHELL, of Hatchechubbee, in the county of Russell and State of Alabama, have invented a new and Improved Cotton-Gin Rib; and I do hereby declare that the following is a full, clear, and exact description of the same, reference being had to the accompanying drawings, forming part of this specification, in which—

Figure 1 is a side view of the rib, showing in dotted lines the position of the saws. Fig. 2 is a face view of that portion of the rib bearing the detachable plate.

My invention relates to an improvement in that class of gin-ribs that have at the point where the saw passes between them a steel plate for resisting the wear to which this part of the rib is subjected, and which plate, being detachable, may be removed and replaced by another whenever it becomes worn or defective. It is specially desirable that this steel plate should be held firmly in place on the face of the rib, for if this plate be jammed sidewise from a bunch of cotton or knot of seed passing through with the saws said plate, in moving sidewise, will strike the teeth of the next adjacent saw and involve the liability of igniting the cotton from the sparks produced, or at least damage the teeth of the saw.

My invention consists in the peculiar construction of the detachable plate and the manner of fixing it in the face of the rib, as will be hereinafter more fully described.

In the drawings, A represents a cotton-gin rib, and B represents in dotted lines the position of the saws.

C is the steel plate, sunk into the face of the rib flush with the same, and held down into the recess made for it by a small screw, $a$, which enters the rib from the side next to the roll-box. The ends of the steel plate I make rounded with the curve of a circle, or angular, and the ends of the recess I make of a similar shape or contour, the bulge of the ends of the plate entering and fitting closely into the sockets or concave walls of the recess, so that the plate is prevented from moving laterally independently of the holding-screw $a$.

Now, in defining my invention with greater clearness, I would state that I am aware that a steel plate has been inlaid in the face of a gin-rib and held by a V-shaped notch at one end and a screw at the other; but experience has demonstrated that the end of the steel plate which is fastened by the screw would sooner or later (by reason of the hardness of the steel plate) wear away the screw from the constant lateral jamming of this end of the plate, due to the wedging action of the cotton, and when said screw becomes worn it then would allow the plate to become sufficiently displaced to be struck by the saws. It is therefore essential to my invention that both ends of the plate should be held by the notched or tongue-and-grooved character of the joint, so as to relieve the screw entirely of wear, which screw has no other function than to hold the plate down flush.

I am aware, also, that other means have been provided for holding both ends of the plate against lateral displacement, and I therefore do not make any claim so broad as to go outside of the inlaid plate, with both ends seated in curved or angular notches to resist lateral displacement. The particular form of my plate has also special merit, for, being formed with circular ends, it can be stamped out without ragged edges, and the circular curve permits the gin-rib to be recessed to receive it by the simple application of a circular milling-tool of the same diameter.

What I claim is—

The combination, with the recessed gin-rib, of the inlaid plate having a screw to hold it down into the recess, and having both its ends fitted into the walls of the recess, with a joint curved or angular in direction across the face of the rib to resist lateral strain without reliance upon the screw, as set forth.

The above specification of my invention signed by me in the presence of two subscribing witnesses.

JORDAN H. MITCHELL.

Witnesses:
 EDW. W. BYRN,
 CHAS. A. PETTIT.